Patented June 3, 1941

2,244,258

UNITED STATES PATENT OFFICE 2,244,258

BASIC TITANIUM PHTHALATE AND METHOD OF MAKING THE SAME

Walter K. Nelson and Arthur O. Ploetz, Metuchen, N. J., assignors to National Lead Company, New York, N. Y., a corporation of New Jersey No Drawing. Application December 21, 1938, Serial No. 247,037

3 Claims. (Cl. 260—429)

The present invention relates to methods for preparing compounds of titanium and phthalic acid, particularly basic titanium phthalates.

Preparation of a normal titanium phthalate has been disclosed by H. A. Gardner, U. S. Patents No. 2,037,323 and No. 2,038,836. In these patents the inventor describes the preparation of sodium phthalate by combining two molecular parts of phthalic acid anhydride with four molecular parts of caustic soda. The resultant sodium phthalate is then reacted with titanium dioxide in the form of a titanium salt solution in the proportion of one mol titanium dioxide and two mols of phthalic acid anhydride in the form of sodium phthalate. The resulting product has a molecular weight of three hundred seventy-six (376) which corresponds to the compound $(C_8H_4O_4)_2Ti$, which is the normal titanium salt of phthalic acid.

We have now unexpectedly found that if the titanium sulfate solution which is reacted with sodium phthalate to form titanium phthalate is so constituted that the ratio of $TiO_2:H_2SO_4$ is below that of the normal salt, it is possible to use lesser amounts of sodium phthalate in preparing a basic titanium phthalate having a higher proportion of titanium combined with phthalate acid radicals. The result is contrary to the expectation that when one reduced the quantity of sodium phthalate the resulting product would be a normal titanium phthalate contaminated with unreacted titanium. However, it is to be understood that regardless of the amount of sodium phthalate employed a basic titanium phthalate will be obtained provided the titanium sulfate solution is constituted as above specified.

According to the present invention we first prepare, in the conventional manner a water-soluble phthalate, such as potassium or sodium phthalate. We prefer to prepare this compound by dissolving phthalic acid anhydride in an aqueous solution of sodium hydroxide in the ratio of one mol phthalic acid anhydride to two mols caustic soda. When the phthalic acid has been completely neutralized the sodium phthalate remains in solution. It is not necessary to obtain this compound in solid form but the aqueous solution is most suitable for the preparation of our novel basic titanium phthalates.

According to our invention we also prepare a solution of a titanium salt, preferably titanium sulfate, in which the ratio of sulfuric acid to titanium is below that of the normal salt and is preferably in the ratio of one part of sulfuric acid to one part of titanium calculated as $TiO_2$, that is, corresponding to a titanyl sulfate solution.

By reacting this titanyl sulfate solution with the aqueous solution of sodium phthalate in such proportions that the molecular ratio of titanium to phthalic acid anhydride is about 1:1, we obtain a precipitate of basic titanium phthalate. These are the optimum conditions. It is not essential to the practice of the invention that a titanium solution be a titanyl sulfate solution; in fact, solutions may be employed in which the ratio of sulfuric acid to titanium dioxide is less than 1:1 or even somewhat more than that amount. However, the best yields of the purest products are obtained when using the titanyl sulfate solution. Furthermore, it is not essential in order to obtain our novel basic titanium phthalates to strictly control the molecular ratio of titanium dioxide to sodium phthalate in the ratio of 1:1. More sodium phthalate may be employed than indicated by these proportions but when so doing the excess sodium phthalate is found in the supernatant liquor. On the other hand, if more titanium is used it is found as precipitated hydrous titanium oxide or as an impurity contaminating the precipitated basic titanium phthalate.

The basic titanium phthalates of our invention contain water of hydration. They have approximately the composition which may be indicated by the formula

and which may be represented graphically in part as

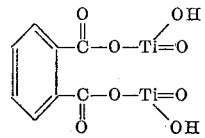

However, the composition does not always correspond exactly to the formula given, but always does approximate it.

The basic titanium phthalates of our present invention are formed as a fine precipitate, slightly yellow in color, which on drying form brown horny lumps similar in appearance to glue or rosin, differing somewhat in color from the normal phthalates described by Gardner, supra. On breaking down these brown horny lumps a fine yellow powder is obtained which becomes brown upon exposure to the actinic rays. The basic titanium phthalate is decomposed by acids and alkalis and to a considerable extent by boiling water and alcohol. They are insoluble in acetone and benzene. The following example will illustrate the preferred method of making our novel basic titanium phthalates:

*Example*

A titanyl sulfate solution was first prepared as follows:

Titanium sulfate cake containing approximately 20 percent $TiO_2$ and 50 percent $H_2SO_4$ was dissolved in an equal weight of water at about 50–60° C. The solution was cooled and treated with a slurry of hydrated lime to neutralize about one-third of the total sulfuric acid contained therein. The calcium sulfate formed was removed by filtration. The resulting solution analyzed as follows:

|  | Per cent |
|---|---|
| $TiO_2$ | 9.8 |
| Total $H_2SO_4$ | 16.4 |
| $H_2SO_4 \supset TiOSO_4$ | 12.1 |
| Excess $H_2SO_4$ | 4.3 |

Ten pounds of the above titanium sulfate solution (0.98 pound $TiO_2$ in solution) was then treated with 5.6 pounds of a caustic soda solution containing 0.35 pound NaOH to adjust the ratio of the solution to one part $TiO_2$ to one part $H_2SO_4$ (in this treatment a precipitate of titanium hydrate may form which, however, will redissolve in the titanium sulfate solution upon continued agitation): the clear solution was next treated with 15 pounds of a sodium phthalate solution containing 1.87 pounds sodium phthalate. The product was filtered, washed substantially free from sulfates and from free phthalic acid and dried at 70–75° C.

The resulting product analyzed:

|  | Per cent |
|---|---|
| $TiO_2$ | 47.6 |
| Phthalic acid anhydride | 45.1 |
| $SO_3$ | 1.5 |
| $H_2O$ | 4.8 |

Mol ratio: $TiO_2 : C_8H_4O_3 = 2 : 1.02$.

We have found that if these basic phthalates are employed to coat titanium dioxide pigments including both composite pigments and the pure dioxide, the resulting treated pigments possess a reduced tendency toward chalking. The coating may be accomplished by any convenient known method. For instance, the basic phthalate may be dissolved in a suitable solvent and the pigment suspended in the resulting solution. Coating of the pigment particles is effected by removing the solvent, as by evaporation. On the other hand, a somewhat more satisfactory coating may be attained if the basic phthalate is formed in media in which the pigment particles have been suspended. For example, the pigment may be suspended in either the titanium sulfate solution or the sodium phthalate solution so that when the two are mixed together the basic phthalate is precipitated directly on the particles of pigment. When the quantities of pigment and basic phthalate are so controlled as to precipitate upon the pigment an amount of basic phthalate calculated as $TiO_2$ between about 1 percent and about 10 percent, preferably about 3½ percent, based on the weight of the pigment the coated pigment possesses superior chalk resistance without loss of tinting strength or other pigment properties.

In respect to development of chalking resistance of titanium dioxide pigments the basic titanium phthalates of the present invention resemble the normal titanium phthalate described by Gardner. Although the basic titanium phthalates contain between about 40 to 50 percent titanium dioxide, they possess but little value themselves as pigments having a tinting strength below 100, as compared with about 1300 for commercial titanium dioxide pigments, but they are excellently adapted for treating titanium dioxide pigments to reduce the chalking tendency of these pigments.

The foregoing description has been given for clearness of understanding and no undue limitations should be deduced therefrom, but the appended claims should be interpreted as broadly as possible in the light of the prior art.

Subject matter disclosed but not claimed herein is claimed in my co-pending application Serial No. 336,006, filed May 18, 1940.

We claim:

1. Method for the preparation of basic titanium phthalate which comprises admixing with a titanium sulfate solution in which the molar ratio of titanium, calculated as $TiO_2$, to sulfuric acid, calculated as $H_2SO_4$, is less than 2:1, a sufficient quantity of a water-soluble phthalate of a metal, the sulfate of which is also soluble, to furnish substantially 1 mol phthalic acid for every two mols of titanium calculated as $TiO_2$, in the said solution, separating, washing and drying the resultant precipitate of basic titanium phthalate.

2. Method for the preparation of basic titanium phthalate which comprises admixing with a titanium sulfate solution in which the molar ratio of titanium, calculated as $TiO_2$, to sulfuric acid, calculated as $H_2SO_4$, is substantially 1:1, a sufficient quantity of sodium phthalate to furnish substantially 1 mol phthalic acid for every two mols of titanium calculated as $TiO_2$, in the said solution, separating, washing and drying the resultant precipitate of basic titanium phthalate.

3. Basic titanium phthalate having the formula $C_8H_4O_4 \cdot (TiO(OH))_2$.

WALTER K. NELSON.
ARTHUR O. PLOETZ.